United States Patent
Jeong

[19]

[11] Patent Number: 6,141,004

[45] Date of Patent: Oct. 31, 2000

[54] METHOD FOR PLAYING MENU IN DIGITAL VIDEO DISC PLAYER

[75] Inventor: Jeong-Ju Jeong, Suwon, Rep. of Korea

[73] Assignee: Samsung Electronics Co., Ltd., Suwon, Rep. of Korea

[21] Appl. No.: 09/046,668

[22] Filed: Mar. 24, 1998

[30] Foreign Application Priority Data

Mar. 25, 1997 [KR] Rep. of Korea ...................... 97-10317

[51] Int. Cl.[7] .............................. G06F 3/02; G11B 27/19
[52] U.S. Cl. ........................... 345/328; 345/354; 345/352
[58] Field of Search .................... 345/354, 352, 345/970, 328; 369/30, 32, 33

[56] References Cited

U.S. PATENT DOCUMENTS

| | | | |
|---|---|---|---|
| 5,218,672 | 6/1993 | Morgan et al. ......................... | 345/501 |
| 5,696,919 | 12/1997 | Masuno et al. ............................ | 369/30 |
| 5,701,385 | 12/1997 | Katsuyama et al. ..................... | 386/106 |
| 5,794,249 | 8/1998 | Orsolini et al. ........................ | 707/104 |

*Primary Examiner*—Raymond J. Bayerl
*Assistant Examiner*—Cuong T. Thai
*Attorney, Agent, or Firm*—Staas & Halsey LLP

[57] ABSTRACT

A DVD (Digital Video Disc) player includes a system controller for controlling an overall operation of the DVD player and an audio/video decoder for decoding DVD bit stream data into audio and video data. The system controller transfers a key input indicative of a menu playback request by a user to the audio/video decoder. The audio/video decoder highlights a selected menu item according to the key input by using highlight information in a control pack of the DVD bit stream and transfers control information for the selected menu item to the system controller. Then, the system controller plays back the menu item according to the control information. The control information includes an executed button number and a button command to be executed.

8 Claims, 6 Drawing Sheets

METHOD FOR PLAYING MENU IN DIGITAL VIDEO DISC PLAYER

BACKGROUND OF THE INVENTION

1. Field of the Invention

The present invention relates to a digital video (or versatile) disc player, and in particular, to a method for playing a menu in a digital video disc player.

2. Description of the Related Art

With the multimedia era at hand, constant efforts to transfer massive amounts of information more rapidly and more accurately have begun to obtain good results by virtue of a remarkable development in digital communication, semiconductor device and digital signal processing (DSP) technologies. Accordingly, the video and audio data can now be transferred and shared in the various forms between different devices, in accordance with an internal data transfer standard such as H.261 and JPEG (Joint Picture Expert Group) by ISO/ITU-TS, and MPEG2 (Moving Picture Expert Group 2) by ISO/IEC.

With the development of an MPEG2 digital image compression technology, it is now possible to play the video data having the same quality as that of an existing video apparatus, at a data transfer rate of just below 10 Mbps. Besides, with the development of an AC-3 audio compression technology capable of playing multichannel audio data, one can enjoy audio and multi-sounds of high quality even at home. Being developed under such environments, a digital video disc (hereinafter referred to as a DVD) or a DVD-R (Recordable) system is expected to cover many roles of the conventional video recording and reproducing apparatuses such as a VTR (Video Tape Recorder) and a CD-ROM, in the near future. The DVD, a disc-type recording medium for a digital moving picture, an record an MPEG2 digital video signal of over 2 hours of video.

Figure 1:
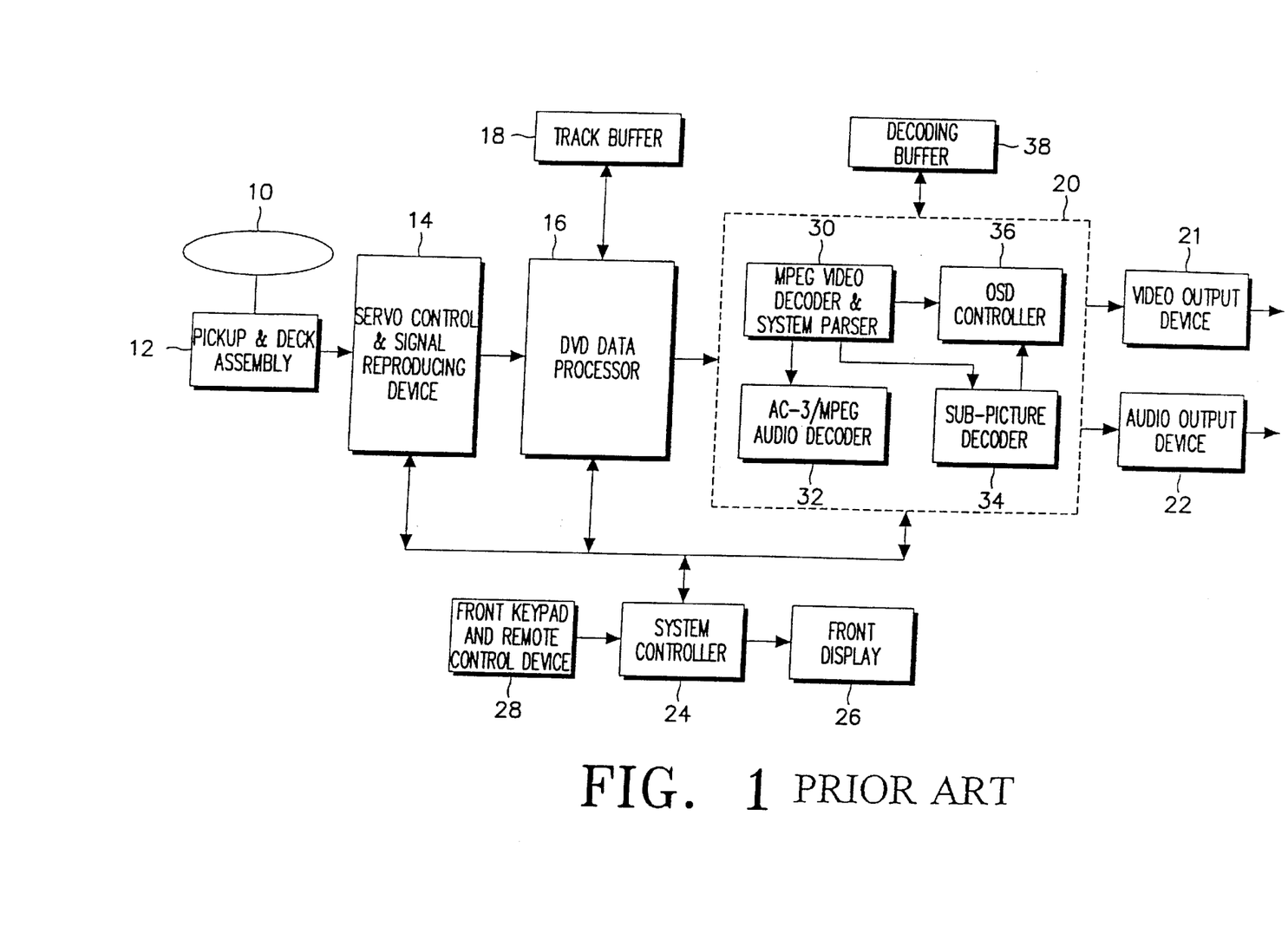
FIG. 1 is a schematic block diagram of a conventional DVD player.

FIG. 1 shows a schematic block diagram of a general DVD player. With reference to FIG. 1, a pickup and deck assembly 12 includes a pickup for irradiating a laser beam onto a disc (i.e., DVD) 10 and receiving a reflected laser beam to read data recorded on the disc 10, and a deck mechanism for controlling rotation and loading of the disc 10, and transferring the pickup. A servo control and signal reproducing device 14 includes a signal reproducing part having amplification, noise deletion, analog-to-digital (A/D) conversion, and synchronous detection functions with respect to an RF (Radio Frequency) signal output from the pickup and deck assembly 12 to thereby reproduce the RF signal, and a servo controller for controlling rotation of the disc 10, and focusing and tracking of the pickup to accurately read the data from the disc 10. The servo controller is controlled by a system controller 24. A DVD data processor 16 demodulates an EFM (eight-to-fourteen modulated) signal output from the servo control and signal reproducing device 14, and performs data PLL (Phase Locked Loop) by means of synchronous detection, descrambling, error detection and correction, and memory control functions.

An internal memory controller for performing the memory control function temporarily stores decoded data into a track buffer 18, and provides an audio/video decoder 20 with the decoded data stored in the track buffer 18 at the request of the audio/video decoder 20. Such memory control function is necessary, because a transfer rate of a signal transferred from the disc 10 to the DVD data processor 16 is higher Than or equal to a transfer rate of a signal transferred from the DVD data processor 16 to the audio/video decoder 20. The system controller 24 controls the memory controller so as to prevent overflow and underflow of the memory. The DVD data processor 16 detects a control data sector contained in a DVD bit stream and provides it to the system controller 24.

The audio/video decoder 20 includes an MPEG video decoder and system parser 30, an AC-3/MPEG audio decoder 32, a sub-picture decoder 34, and an OSD (On-Screen Display) controller 36. The system parser analyzes the output signal of the DVD data processor 16 to divide it into audio, video and sub-picture data. The audio data is applied to the AC-3/MPEG audio decoder 32, the video data to an MPEG video decoder, and the sub-picture data to the sub-picture decoder 34, respectively. The video data decoded at the video decoder and the sub-picture data decoded at the sub-picture decoder 34 are applied to the OSD controller 36. The OSD controller 36 mixes the video data from the MPEG video decoder with the sub-picture data from the sub-picture decoder 34, and provides its output to a video output device 21. The audio data output from the AC-3/MPEG audio decoder 32 is applied to an audio output device 22.

A decoding buffer 38 is used by the MPEC video decoder system parser 30, the AC-3/MPEG audio decoder 32, and the sub-picture decoder 34 in the processing of executing the corresponding decoding operations. The system controller 24 performs servo control, data seek, and deck mechanism control operations to read the data from the disc 10. Further, the system controller 24 controls an overall operation of the DVD player according to the control data from a front keypad and remote control device 28. The front keypad and remote control device 28 includes a plurality of numeric and function keys for generating key data according to a key depression by an operator. The key data generated is applied to the system controller 24. A front display 26 displays thereon display data and various operational information under the control of the system controller 24.

Figure 2:
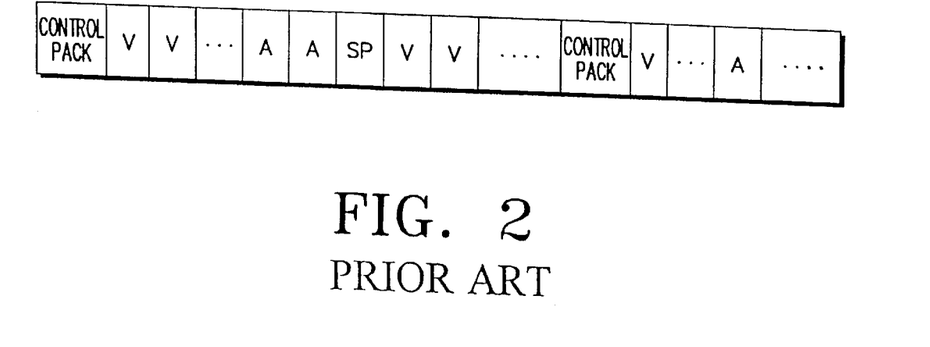
FIG. 2 is a diagram showing a data format of a DVD bit stream.

FIG. 2 shows a data format of the DVD bit stream used in the DVD player of FIG. 1. With reference to FIG. 2, the DVD bit stream includes a control pack, MPEG video packs V, AC-3/MPEG audio packs a, and a sub-picture data pack SP for displaying captions and menus. The control pack is a data sector including control information for the DVD bit stream. The control information has highlight information HLI including various highlight-related data required in playing the menus. That is, the highlight information HLI includes information representative of display start and end times, the number of buttons, forced execution start time, button display mode (16:9, 4:3, letter box), button offset value, button position data, commands corresponding to the respective buttons, automatic execution of a selected button, etc.

Figure 3:
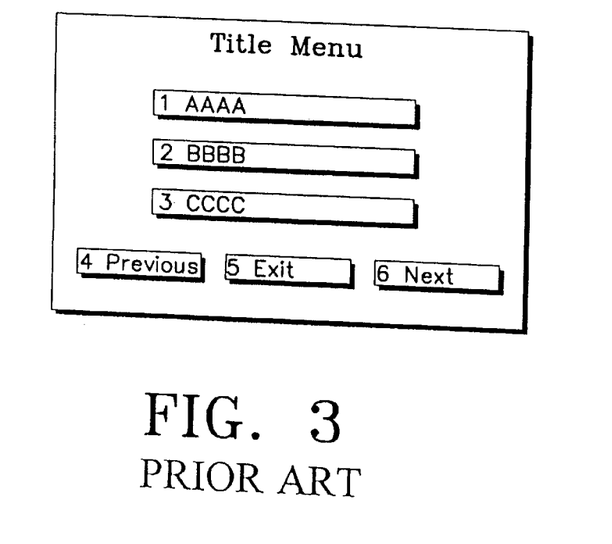
FIG. 3 is a diagram showing a menu screen according to the conventional DVD player.

FIG. 3 shows a menu screen of the DVD player, by way of example. As illustrated, the menu screen includes, for example, six buttons corresponding to six sub-titles. Position and color of the respective buttons, the number of the buttons, and a color of a selected button are determined by the highlight information HLI.

Figure 4:
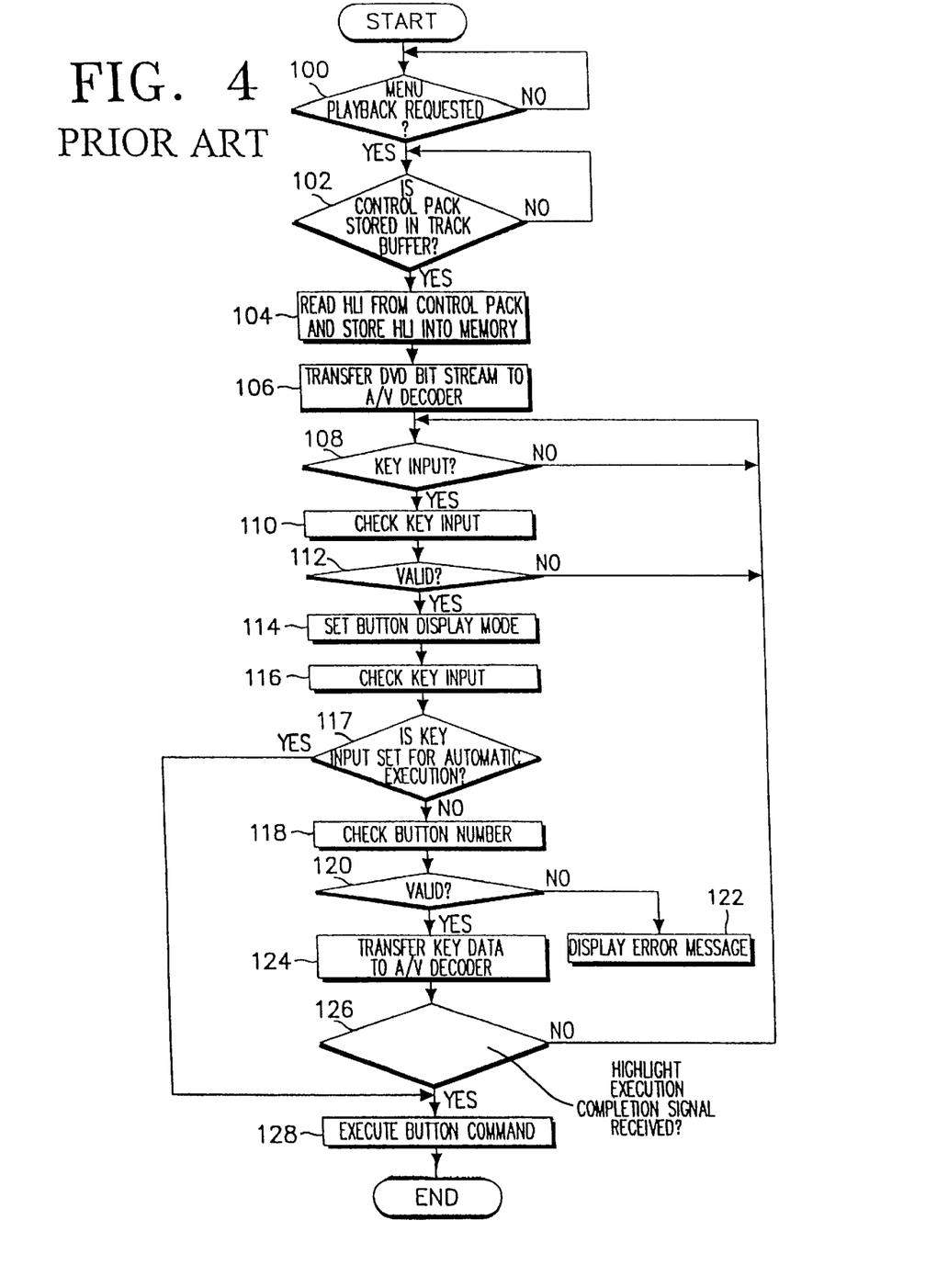
FIG. 4 is a flowchart of a system controller, for processing highlight information according to the conventional DVD player.
Figure 5:
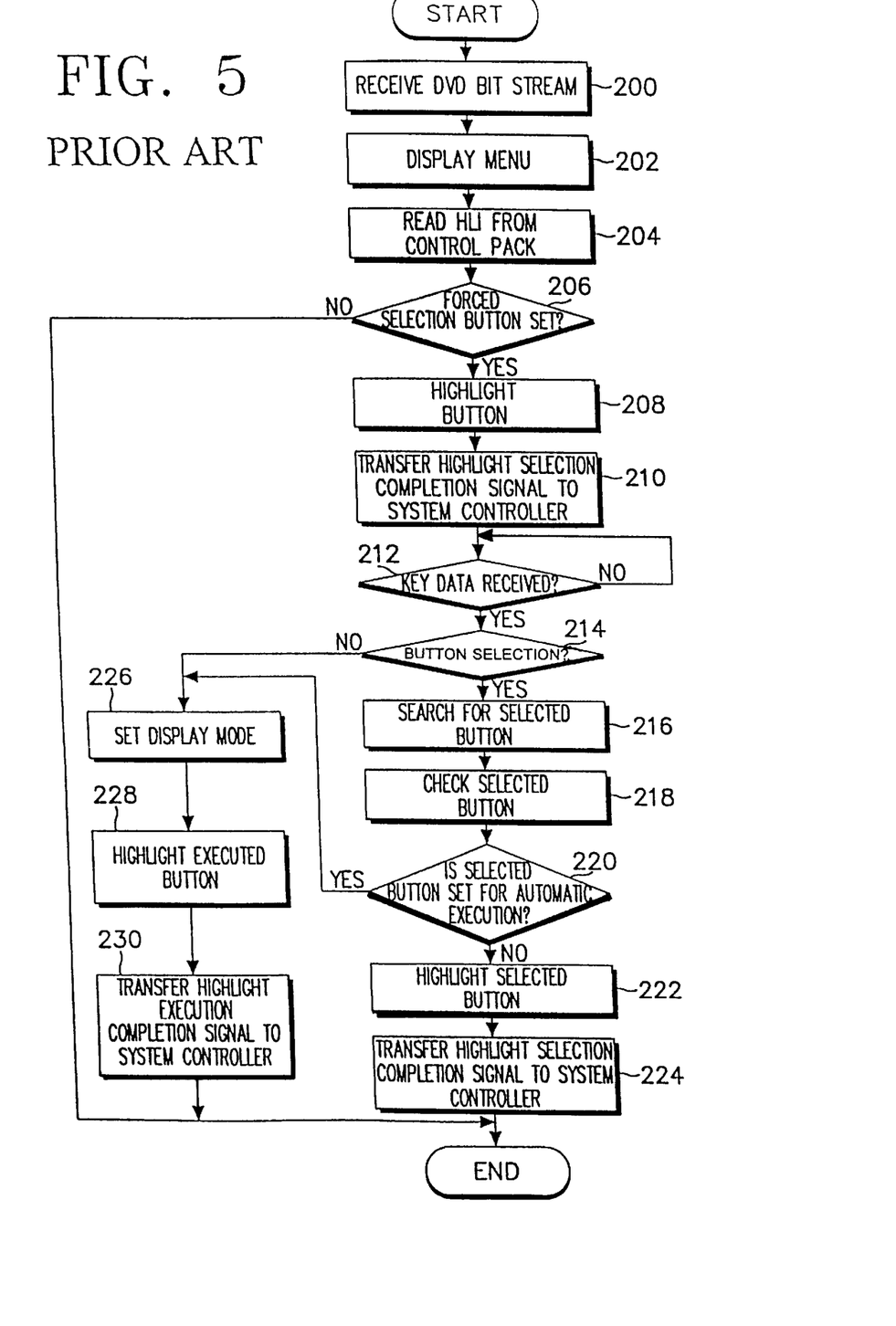
FIG. 5 is a flowchart of an audio/video decoder, for processing highlight information according to the conventional DVD player.

FIG. 4 shows a flow chart of the system controller 24, for playing the menu according to the prior art, and FIG. 5 shows a flow chart of the audio/video decoder 20, for playing the menu according to the prior art.

Upon playback of the DVD bit stream for the menu, the DVD data processor 16 stores the control pack of the DVD bit stream into the track buffer 18. If the user makes a request for playing the menu by using the front keypad and remote control device 28, the system controller 24 senses it at step 100 of FIG. 4, and proceeds to step 102 to check whether the control pack is stored in the track buffer 18 or not. If the control pack is stored in the track buffer 18, the system controller 24 proceeds to step 104 to read out the highlight information HLI from the control pack and store it into an internal memory. Thereafter, at step 106, the system controller 24 transfers the DVD bit stream stored in the track buffer 18 to the audio/video decoder 20. As a result, the DVD bit stream stored in the track buffer 18 is transferred to the audio/video decoder 20 via the DVD data processor 16.

After transferring the DVD bit stream, the system controller 24 checks, at step 108, whether a key input is received from the front keypad and remote controller 28. The user may select a specified menu item by depressing button selection keys, numeric keys, and an enter key prepared on the front keypad and remote controller 28. Upon receiving a certain key input at the step 108, the system controller 24 checks, at steps 110 and 112, whether the key input is valid or not by referring to the highlight information HLI stored in the internal memory. If the key input is valid, the system controller 24 proceeds to step 114 to set a current button display mode (16:9, 4:3, and letter box) referring to the highlight information HLI. At steps 116 and 117, it is checked whether the key input is set for automatic execution or not referring to the highlight information HLI. The automatic execution function indicates that the command of a selected button is immediately executed. In the case of non-automatic execution, a command is executed after an enter key is stroked following button selection. If it is set for the automatic execution, the procedure proceeds to step 128 to automatically execute a command of the corresponding button. However, if the key input is not set for the automatic execution, the system controller 24 checks, at steps 118 and 120, whether the selected button number is valid or not. That is, it is checked whether the selected key is coincident with a button number corresponding to the highlight information HLI. If the selected button number is invalid, the system controller 24 displays an error message on the front display 26, at step 122. If the selected button number is valid, the key data is transferred to the audio/video decoder 20, at step 124.

In the meantime, the audio/video decoder 20 receives the DVD bit stream transferred (at the step 106 of FIG. 4) from the system controller 24, at step 200. Upon receiving the DVD bit stream, the audio/video decoder 20 displays the menu screen as shown in FIG. 3 by using information in the sub-picture data pack SP, at step 202. Thereafter, the audio/video decoder 20 reads the highlight information HLI from the received control pack, at step 204 and checks, at step 206, whether a forced selection button is set or not. The forced selection button controls the function that selects some buttons so as to be highlighted, or in other words, the function that some buttons are highlighted in the default state. If the forced selection button is set, the procedure proceeds to step 208 to highlight the corresponding button on the menu screen. For instance, the audio/video decoder 20 highlights a button "1. AAAA" set for the forced selection button of FIG. 3. Then, at step 210, the audio/video decoder 20 transfers a highlight selection completion signal for the corresponding button to the system controller 24.

Meanwhile, the system controller 24 checks at step 126 whether a highlight execution completion signal is received from the audio/video decoder 20. If the highlight execution completion signal is not received (instead, if the corresponding highlight selection completion signal transmitted from the audio/video decoder 20 is received), the procedure returns to the step 108 to repeat the succeeding steps. The highlight execution completion signal is generated after the menu item of a selected button is executed, anal the highlight selection completion signal is generated after a button to be highlighted is selected.

Referring back to FIG. 5, the audio/video decoder 20 checks at step 212 whether the key data corresponding to the selected button number transmitted at the step 124 from the system controller 24 is received or not. If the key data is received, the procedure proceeds to step 214 to check whether the key data relates to button selection. If it relates to button selection, the audio/video decoder 20 searches for the selected button at step 216, and checks, at steps 218 and 220, whether the button selection is set for the automatic execution referring to the highlight information HLI of the received control pack. If the button selection is not set for the automatic execution, the audio/video decoder 20 highlights the selected button in a color specified by the highlight information HLI, at step 222. Then, at step 224, the audio/video decoder 20 transfers the highlight selection completion signal to the system controller 24.

However, if the key data does not relate to button selection or if button selection is set for the automatic execution at the step 220, the audio/video decoder 20 proceeds to step 226 to set a display mode. If the key data does relate to button selection, it is meant that the key data corresponds to an execution key. In the display mode, the audio/video decoder 20 refers to the highlight information HLI of the received control pack. Thereafter, the audio/video decoder 20 highlights the executed button in a specified color, at step 228 and transfers a highlight execution completion signal to the system controller 24, at step 230.

Referring back to FIG. 4, the system controller 24 checks, at the step 126, whether the highlight execution completion signal is received. If the highlight execution completion signal is received, the system controller 24 proceeds to step 128 to execute the corresponding command.

As described above, in the conventional menu playing method, the system controller 24 checks every item of information of the control pack to control the audio/video decoder 20 according thereto. Thus, the conventional menu playing method needs the system controller having a high operating speed to rapidly read the control pack from the DVD data processor 16. Furthermore, in the conventional menu playing method, the control pack that the system controller 24 currently has should necessarily coincide with the control pack transferred previously to the audio/video decoder 20. If not so, an error may occur. In order to prevent occurrence of the error, the previously transferred control pack should be stored into the internal memory of the system controller 24 during track buffer controlling of the DVD data processor 16, thereby to prevent overwriting of the following other control pack.

SUMMARY OF THE INVENTION

It is therefore an object of the present invention to provide a method for processing highlight information without error and reducing the load of a system controller.

It is another object of the present invention to provide a method for effectively playing a digital video disc.

Additional objects and advantages of the invention will be set forth in part in the description which follows, and, in part, will be obvious from the description, or may be learned by practice of the invention.

To achieve the above and other objects, there is provided a DVD player including a system controller for controlling an overall operation of the DVD player and an audio/video decoder for decoding DVD bit stream data into audio and video data. The system controller transfers a key input indicative of a menu playback request by a user to the audio/video decoder. The audio/video decoder highlights a selected menu item according to the key input by using highlight information in a control pack of the DVD bit stream and transfers control information for the selected menu item to the system controller. Then, the system controller plays back the menu item according to the control information. The control information includes an executed button number and a button command to be executed.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

A preferred embodiment of the present invention will be described in detail hereinbelow with reference to the accompanying drawings. For a comprehensive understanding of the present invention, the present invention will be illustratively described, confined to the specific embodiment. However, it should be noted that the present invention can be implemented by anyone skilled in the art with the description, not the details. In the following description, well-known functions or constructions which may obscure the present invention in unnecessary detail are not described in detail.

Figure 6:
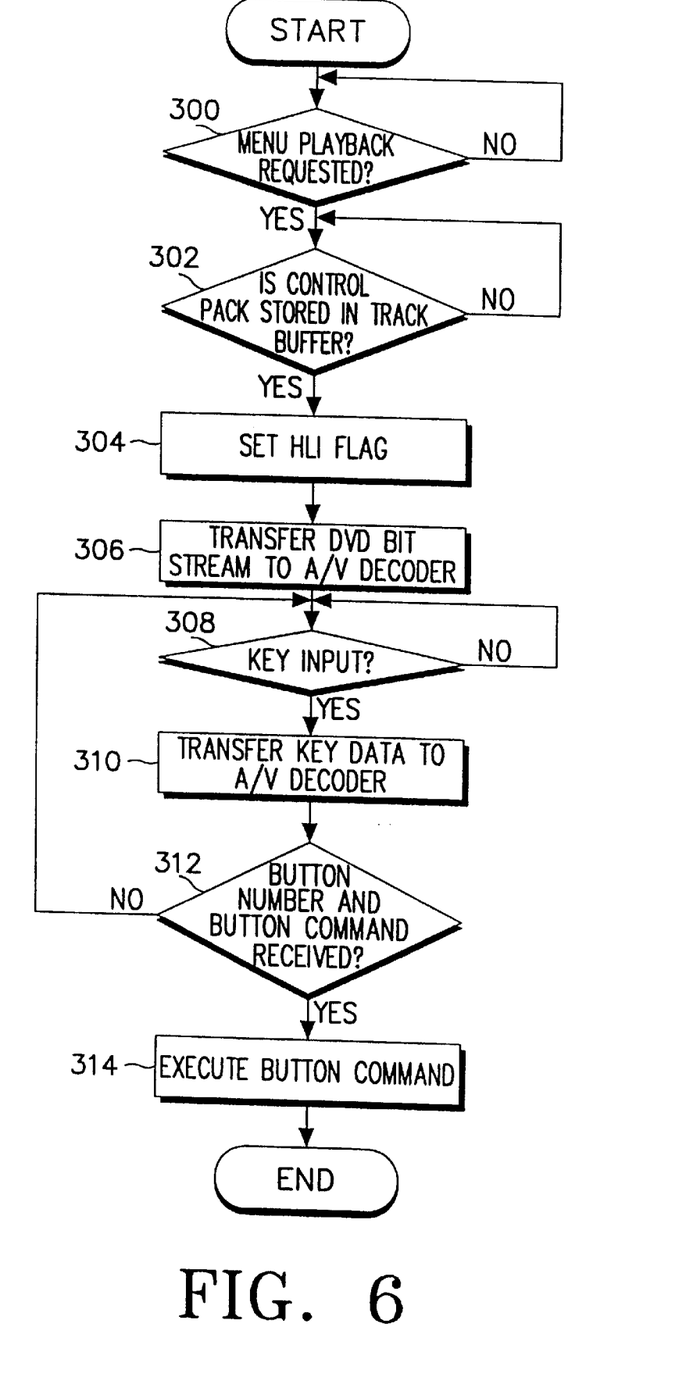
FIG. 6 is a flowchart of a system controller, for processing highlight information according to an embodiment of the present invention.
Figure 7:
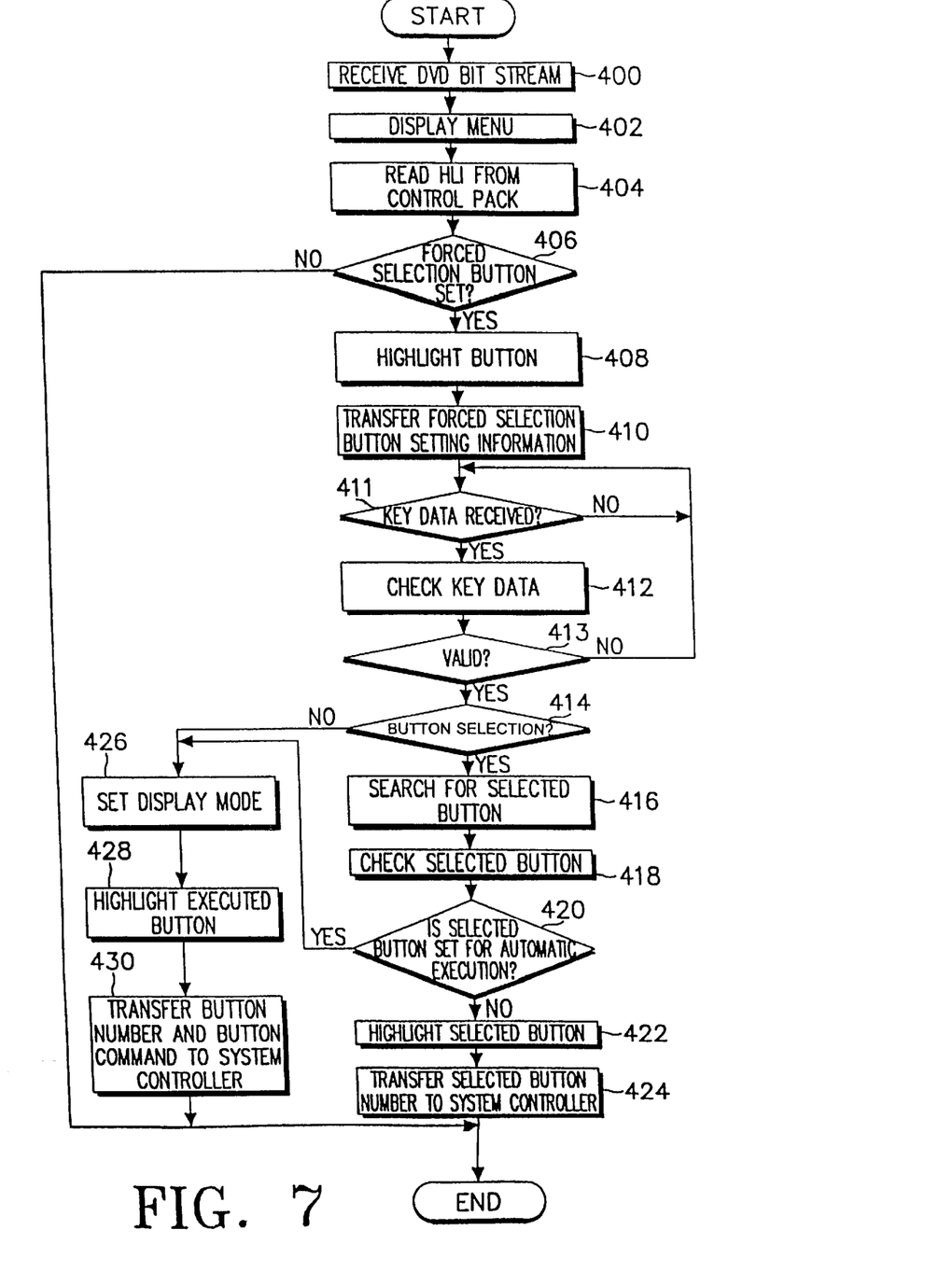
FIG. 7 is a flowchart of an audio/video decoder, for processing highlight information according to the embodiment of the present invention.

FIG. 6 shows a flowchart of the system controller 24, for processing the highlight information HLI according to the preferred embodiment of the present invention, and FIG. 7 shows a flowchart of the audio/video decoder 20, for processing the highlight information HLI according to the preferred embodiment of the present invention.

Referring to FIG. 6, upon playback of the DVD bit stream for the menu, the DVD data processor 16 stores the control pack of the DVD bit stream into the track buffer 18. If the user makes a request for playing the menu by using the front keypad and remote control device 28, the system controller 24 senses it at step 300 of FIG. 6, and proceeds to step 302 to check whether the control pack is stored in the track buffer 18 or not. If the control pack is stored in the track buffer 18, the system controller 24 proceeds to step 304 to set a flag representative of the existence of the highlight information HLI in the control pack. Thereafter, at step 306, the system controller 24 transfers the DVD bit stream stored in the track buffer 18 to the audio/video decoder 20. As a result, the DVD bit stream stored in the track buffer 18 is transferred to the audio/video decoder 20 via the DVD data processor 16.

After transferring the DVD bit stream, the system controller 24 checks, at step 308, whether a key input is received from the front keypad and remote controller 28. The user may select a specified menu item by depressing button selection keys, numeric keys, and an enter key on the front keypad and remote controller 28. Upon receiving a certain key input at the step 308, the system controller 24 transfers the key input to the audio/video decoder 20, at step 310.

In the meantime, the audio/video decoder 20 receives the DVD bit stream transferred (at the step 306 of FIG. 6) from the system controller 24, at step 400. Upon receiving the DVD bit stream, the audio/video decoder 20 displays the menu screen as shown in FIG. 3 by using information in the sub-picture data pack SP, at step 402. Thereafter, the audio/video decoder 20 reads the highlight information HLI from the received control pack, at step 404 and checks, at step 406, whether a forced selection button is set or not. If the forced selection button is set, the procedure proceeds to step 408 to highlight a corresponding button on the menu screen. For instance, the audio/video decoder 20 highlights a button "1. AAAA" set for the forced selection button of FIG. 3. Then, at step 410, the audio/video decoder 20 transfers information indicative of a setting status of the forced selection button to the system controller 24.

Meanwhile, the system controller 24 checks, at step 312, whether an executed button number and a button command to be executed are received from the audio/video decoder 20. If the executed button number and the button command are not received (instead, if the information indicative of a setting status of the forced selection button or a selected button number is received), the procedure returns to the step 308 to repeat the succeeding steps.

Referring back to FIG. 7, the audio/video decoder 20 checks, at step 411, whether the key data transmitted (at the step 310) from the system controller 24 is received or not. If the key data is received, the audio/video decoder 20 checks, at steps 412 and 413, whether the key data is valid by referring to the highlight information HLI in the control pack. As a result, if the key data is valid, the audio/video decoder 20 proceeds to step 414 to check whether the key data relates to button selection. If it relates to button selection, the audio/video decoder 20 searches for the selected button, at step 416 and checks, at steps 418 and 420, whether the button selection is set for the automatic execution referring to the highlight information HLI of the received control pack. If the button selection is not set for the automatic execution, the audio/video decoder 20 highlights the selected button in a color specified by the highlight information HLI, at step 422. Then, at step 424, the audio/video decoder 20 transfers the selected button number to the system controller 24.

If the key data does not relate to button select on at the step 414, or if the selected button is set for the automatic execution at the step 420, the audio/video decoder 20 proceeds to step 426 to set the display mode. If the key data does not correspond to the button selection, it is meant that the key data corresponds to an execution key. In the display mode, the audio/video decoder 20 refers to the highlight information HLI of the received control pack. Thereafter, the audio/video decoder 20 highlights the executed button in a specified color, at step 428, and transfers the executed button number and the button command to be executed to the system controller 24, at step 430.

Referring back to FIG. 6, the system controller 24 checks, at the step 312, whether the executed button number and the button command to be executed are received. If the executed button number and the button command to be executed are received, the system controller 24 proceeds to step 314 to execute the corresponding command.

As can be appreciated from the foregoing, in accordance with the present invention, the audio/video decoder controls the menu playback operation which was conventionally performed by the system controller, thereby decreasing the load of the system controller. Therefore, the DVD player of the invention can effectively play the DVD bit stream.

Although an illustrative embodiment of the present invention has been described herein with reference to the accompanying drawings, it is to be understood that the invention is not limited to this precise embodiment, and that various other changes and modifications may be affected therein by one skilled in the art without departing from the scope or spirit of the invention.

What is claimed is:

1. An optical disc player to read an optical disc bit stream from an optical disc and to display a menu, comprising:

a system controller to control an overall operation of the optical disc player;

an audio/video decoder to decode the optical disc bit stream into audio data and video data, and to control a playback operation of the menu by transferring control information for the menu playback operation to said system controller; and a key input device to receive a key input indicative of a playback menu request from a user;

wherein the system controller receives the key input from the key input device and transfers the key input to the audio/video decoder, and the audio/video decoder checks whether the key input has been received, checks whether the key input received from the system controller is valid by referring to the optical disc bit stream, checks whether a key input has been received if the key input is not valid and determines whether the key input relates to button selection if the key input is valid.

2. The optical disc player as claimed in claim 1, wherein the system controller transfers the optical bit stream from the optical disc to the system controller, wherein the optical bit stream includes a control pack having highlight information, and the audio/video decoder checks whether the key input received from the system controller is valid by referring to the highlight information of the control pack.

3. The optical disc player as claimed in claim 2, wherein the audio/video decoder searches for a selected button if the key input relates to button selection, checks whether the button selection is set for automatic execution by referring to the highlight information of the control pack, highlights the selected button and transfers a selected button number to the system controller if the button selection is not set for the automatic execution, and sets a display mode if the key input does not relate to button selection or if the button selection is set for the automatic selection, wherein the button selection not being set for the automatic execution indicates correspondence to an execution key.

4. The optical disc player as claimed in claim 3, wherein:

the audio/video decoder highlights an executed button subsequent to setting the display mode, and transfers a number of the executed button to the system controller; and the system controller checks whether the executed button number and a button command have been received and executes the button command if the executed button number and the button command have been received.

5. A menu playback method in an optical disc player including a system controller to control an overall operation of the optical disc player and an audio/video decoder to decode the optical bit stream into audio data and video data, the method comprising:

receiving a key input indicative of a playback menu request from a user;

having the system controller transfer the key input to the audio/video decoder; and having the audio/video decoder check whether the key input has been received, check whether the key input received from the system controller is valid by referring to the optical disc bit stream, check whether a new key input has been received if the key input is not valid and determine whether the key input relates to button selection if the key input is valid.

6. The menu playback method as claimed in claim 5, wherein further comprising:

having the system controller transfer the optical bit stream from the optical disc to the system controller, wherein the optical bit stream includes a control pack having highlight information; and having the audio/video decoder check whether the key input received from the system controller is valid by referring to the highlight information of the control pack.

7. The menu playback method as claimed in claim 6, further comprising:

having the audio/video decoder search for a selected button if the key input relates to button selection, check whether the button selection is set for automatic execution by referring to the highlight information of the control pack, highlight the selected button and transfer a selected button number to the system controller it the button selection is not set for the automatic execution, and set a display mode if the key input does not relate to button selection or if the button selection is set for the automatic selection, wherein the button selection not being set for the automatic execution indicates correspondence to an execution key.

8. The menu playback method as claimed in claim 7, further comprising:

having the audio/video decoder highlight an executed button subsequent to setting the display mode, and transfer a number of the executed button to the system controller; and having the system controller check whether the executed button number and a button command have been received and execute the but on command if the executed button number and the button command have been received.

* * * * *

UNITED STATES PATENT AND TRADEMARK OFFICE
CERTIFICATE OF CORRECTION

PATENT NO.:     6,141,004
DATED     :     October 31, 2000
INVENTOR(S):    Jeong-Ju JEONG It is certified that [an/error[s]] appears in the above-identified patent and that said Letters Patent is hereby corrected as shown below:

Column 8, line 45, change "it" to --if--;
        line 60, change "but on" to --button--.

Signed and Sealed this

Twenty-ninth Day of May, 2001

Attest:

NICHOLAS P. GODICI

*Attesting Officer*     *Acting Director of the United States Patent and Trademark Office*